United States Patent [19]

Hiramatsu

[11] Patent Number: 4,873,588
[45] Date of Patent: Oct. 10, 1989

[54] APPARATUS FOR STORING DIGITAL DATA

[75] Inventor: Akihiko Hiramatsu, Kanagawa, Japan

[73] Assignee: Sony Corporation, Tokyo, Japan

[21] Appl. No.: 137,344

[22] Filed: Dec. 23, 1987

[30] Foreign Application Priority Data

Dec. 23, 1986 [JP] Japan ................................. 61-307186

[51] Int. Cl.[4] .............................................. G11B 5/09
[52] U.S. Cl. ..................................................... 360/47
[58] Field of Search ........................... 360/47, 32, 38.1

[56] References Cited

U.S. PATENT DOCUMENTS 4,398,224 8/1983 Watanabe ........................... 360/38.1

Primary Examiner—Vincent P. Canney

[57] ABSTRACT

An apparatus for storing digital data which is applied to a PCM audio tape recorder incorporates a data input circuit to receive data blocks each having block address data identifying the block, main data, and redundancy data forming an error detection/correction code together with data including block address data for detecting the presence/absence of errors in the block address data; an error detector to detect the presence/absence of errors in the block address data by use of the redundancy data and to produce an error detection signal when any error is detected; a first write address generator to generate first write address data; a first RAM to store the main data among the data block address to the first write address data; a second write address generator to generate second write address data; a second RAM to store the first write address data from the first write address generator according to the second write address data when the address data is determined to have no error by the error detector; a second read address generator to generate second read address data, whereby the first write address data in the second RAM is read out according to the second read address data; and a first read address generator to generate first read address data according to the first write address data read out from the second RAM, whereby the main data in the first RAM is read out according to the first read address data.

1 Claim, 9 Drawing Sheets

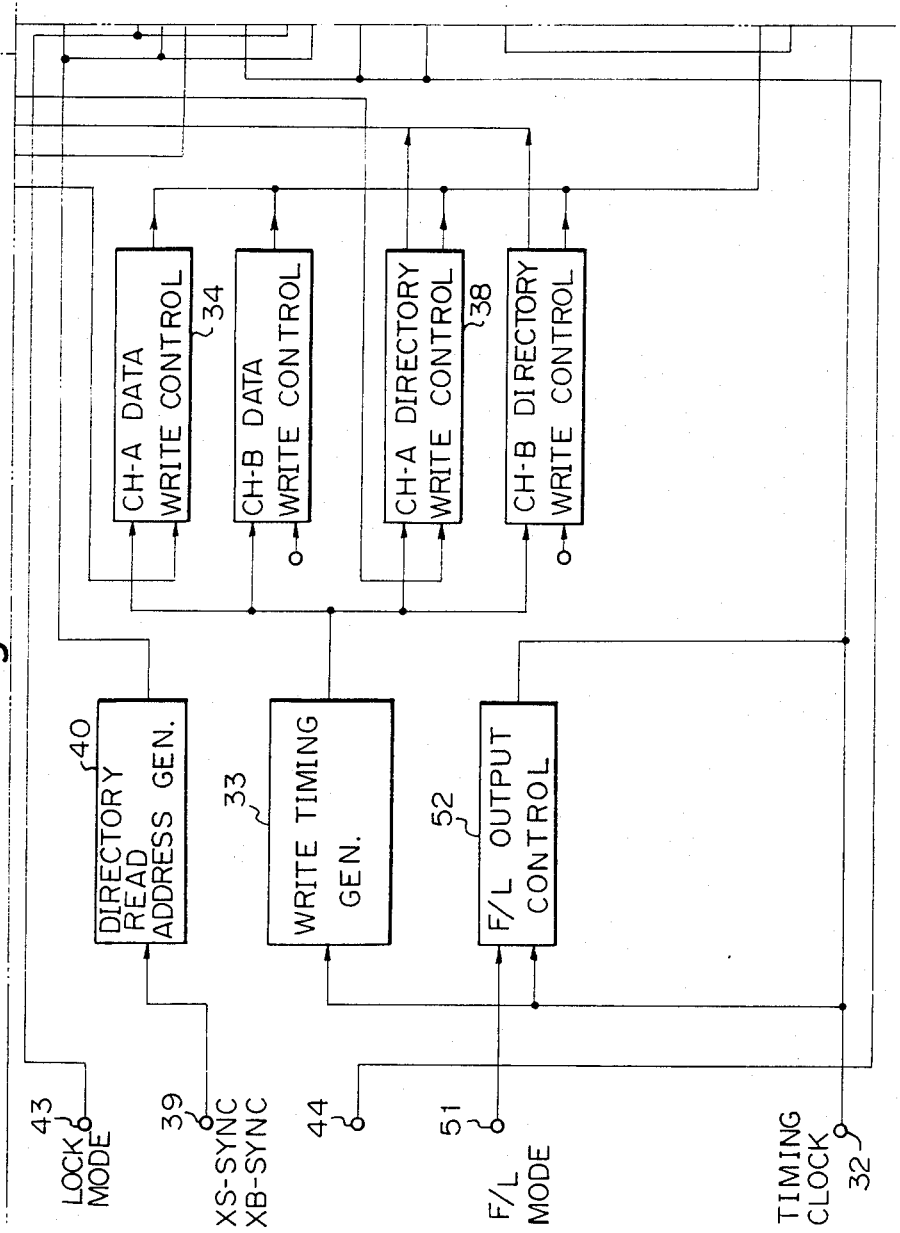

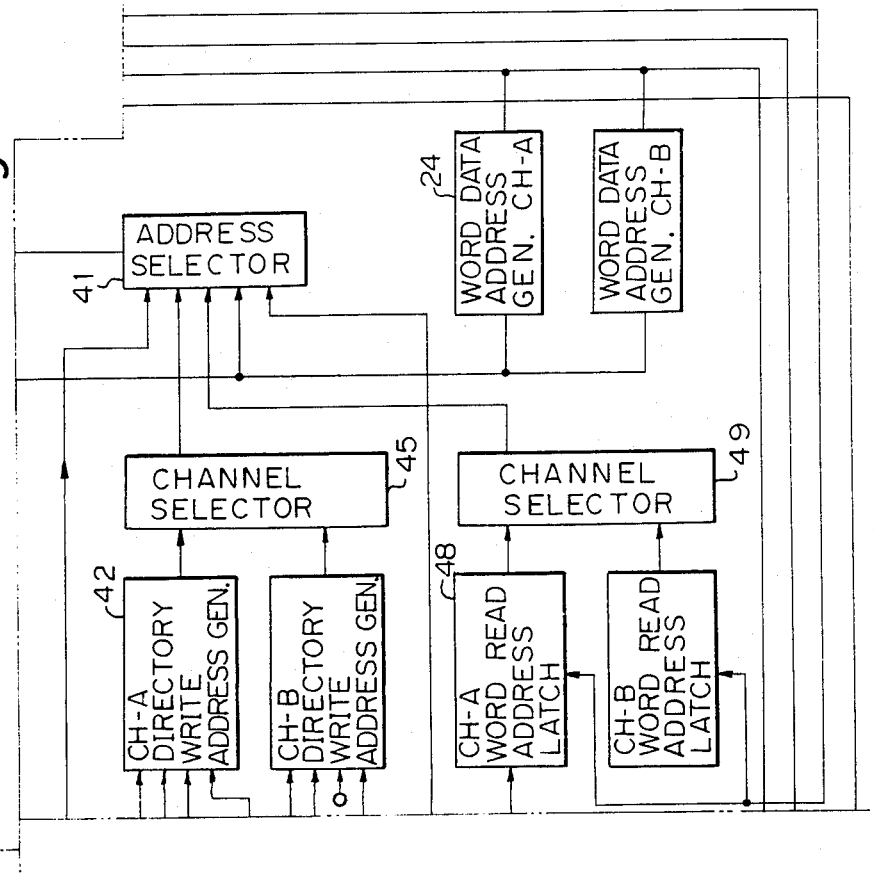

APPARATUS FOR STORING DIGITAL DATA

BACKGROUND OF THE INVENTION

1. Field of the Invention

The present invention relates to an apparatus for storing digital data and, more particularly, to an apparatus for storing digital data which is applied to a PCM audio tape recorder or the like.

2. Description of the Prior Art

In PCM digital audio tape recorders, in general, data to be recorded is divided into a plurality of blocks every predetermined amount of the data. For example, each block comprises: a block sync signal locating at the beginning; a block address arranged at the next position; and audio data and the like located after the block address.

In the case where such a data train, divided into the blocks each having such a data constitution, is reproduced from a magnetic tape, the time base fluctuation component is included in the reproduction signal due to a variation in running speed of the magnetic tape or the like. To eliminate such a time base fluctuation component, there is used a time base correction circuit which is constituted in a manner such that the reproduction data is written into a buffer memory in response to a write clock synchronized with the reproduction signal and the data is read out of the buffer memory in response to a read clock based on a clock of a constant frequency which is generated from a crystal oscillator or the like. When the reproduction data is written into the buffer memory, the block address in the reproduction data is referred to during every block, and the data in this block is written into the address in the buffer memory which is determined by this block address. Therefore, the block address needs to be correctly reproduced. At least the block address of each block is encoded using an error detection code such as a CRC code or the like and recorded. The presence or absence of an error of the reproduced block address is checked using the error detection code. If the reproduced block address has been determined to be erroneous, the data in this block is not written into the buffer memory or written as erroneous data. An example of such a time base correction circuit has been disclosed in U.S. Pat. No. 4,398,224.

In such a conventional time base correction circuit, when the reproduction data is written into the buffer memory, it is necessary that the result of the error detection by the CRC code be known. However, the result of the error detection is unknown until all of the reproduced data of one block are obtained. Therefore, for example, as disclosed in U.S. Pat. No. 4,398,224, there are drawbacks, such that a delay circuit and a temporary memory to store at least the data of one block and a memory control circuit to control them are necessary, and a large amount of memory capacity is needed, and the circuit constitution becomes complicated.

OBJECTS OF THE INVENTION

It is, therefore, an object of the invention to provide an apparatus for storing digital data which can solve the foregoing conventional drawbacks.

In particular, it is an object of the invention to provide an apparatus for storing digital data with a simple circuit constitution.

Another object of the invention is to provide an apparatus for storing digital data in which the memory capacity can be reduced.

Still another object of the invention is to provide an apparatus for storing digital data in which the control circuits of memories can be reduced.

According to the present invention, these objects are accomplished by an apparatus for storing digital data comprising: data input means for receiving data blocks each including at least block address data identifying the block, main data, and redundancy data forming error detection or correction code together with data including the block address data for detecting presence or absence of any error in the block address data; error detecting means for detecting presence or absence of any error in the block address data with use of the redundancy data and for producing an error detection signal when any error is detected in the block address data; first write address generating means for generating first write address data; first memory means for storing at least the main data among the data block according to the first write address data from the first write address generating means; second write address generating means for generating second write address data; second memory means for storing the first write address data from the first write address generating means according to the second write address data from the second write address generating means when the address data is determined to have no error by the error detecting means; second read address generating means for generating second read address data, whereby the first write address data stored in the second memory means is read out according to the second read address data; and first read address generating means for generating first read address data according to the first write address data read out from the second memory means, whereby the main data stored in the first memory means is read out according to the first read address data.

BRIEF DESCRIPTION OF THE DRAWINGS

FIGS. 3A through F is a block diagram showing the main section of a time base correction circuit shown in FIG. 2.

DESCRIPTION OF THE PREFERRED EMBODIMENTS

The present invention will be described in detail hereinbelow with reference to the drawings, with respect to an embodiment in which the invention is applied to a memory apparatus of a multichannel digital audio tape recorder, particularly, to a time base correction circuit of a reproducing circuit.

Figure 1:
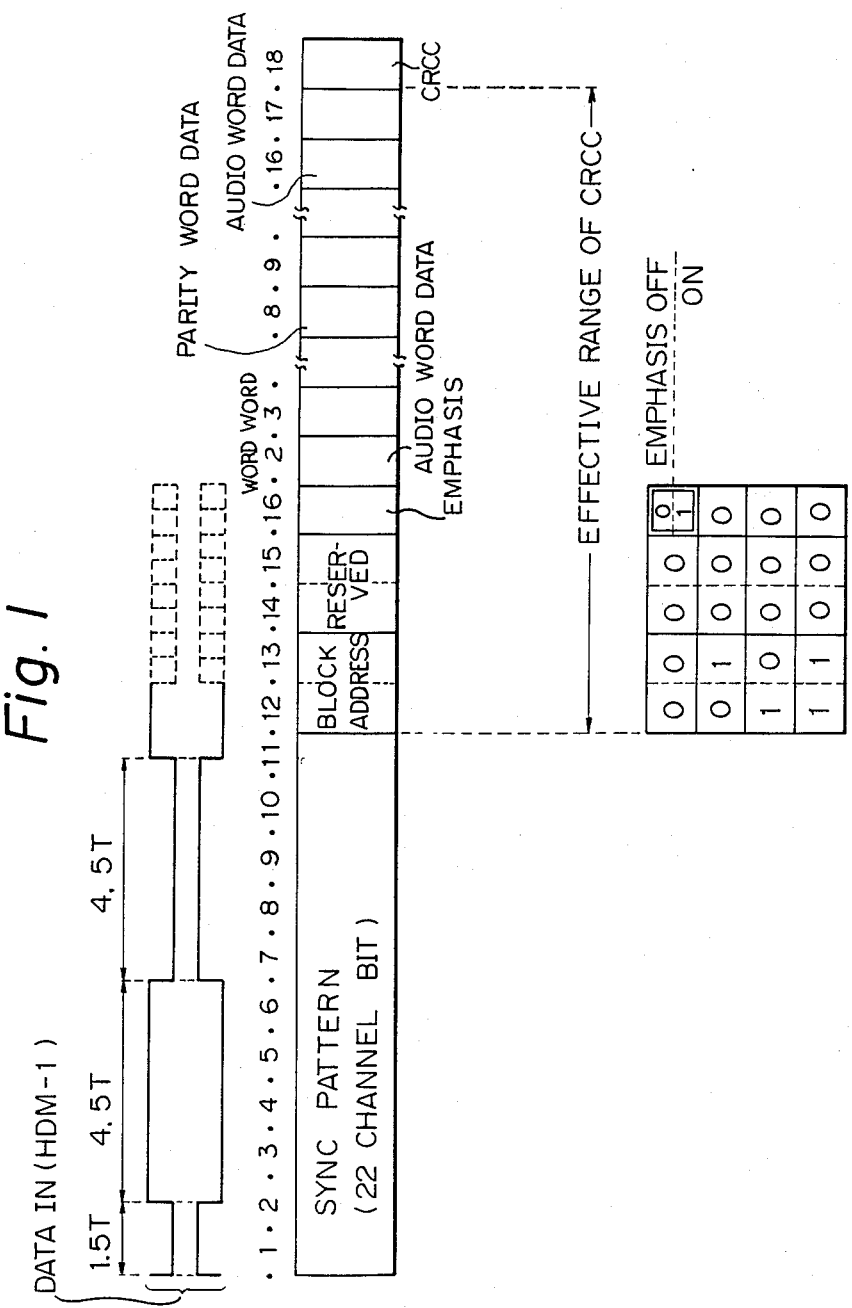
FIG. 1 is a schematic diagram showing an example of a recording format of a digital audio tape recorder to which the present invention is applied.

FIG. 1 shows a block constituting of data which is recorded or reproduced by the digital audio tape recorder. In each block, a block sync pattern of eleven bits is formed in the beginning, a block address of two bits is then arranged, reserved bits of two bits are subsequently arranged, and a flag bit of one bit is then arranged. The reserved bits correspond to the undefined area. In the block having the address "00", the flag bit indicates the information of emphasis on/off by "1" bit. In the other blocks, the flag bit is set to "0". A sync word of sixteen bits is constituted by the block sync pattern, block address, reversed bits, and flag bit. Subsequent to the sync word, the audio data of twelve words each consisting of sixteen bits and the parity data of four words are arranged. Finally, a redundancy code forming a CRCC (Cyclic Redundancy Check Code) of sixteen bits is arranged. The CRCC is assigned for the data of the sync word, audio data, and parity data after the block address of two bits. The details of these formats are disclosed in U.S. Pat. No. 4,398,224, although they are partially different. Therefore, its description is omitted here.

Figure 2:
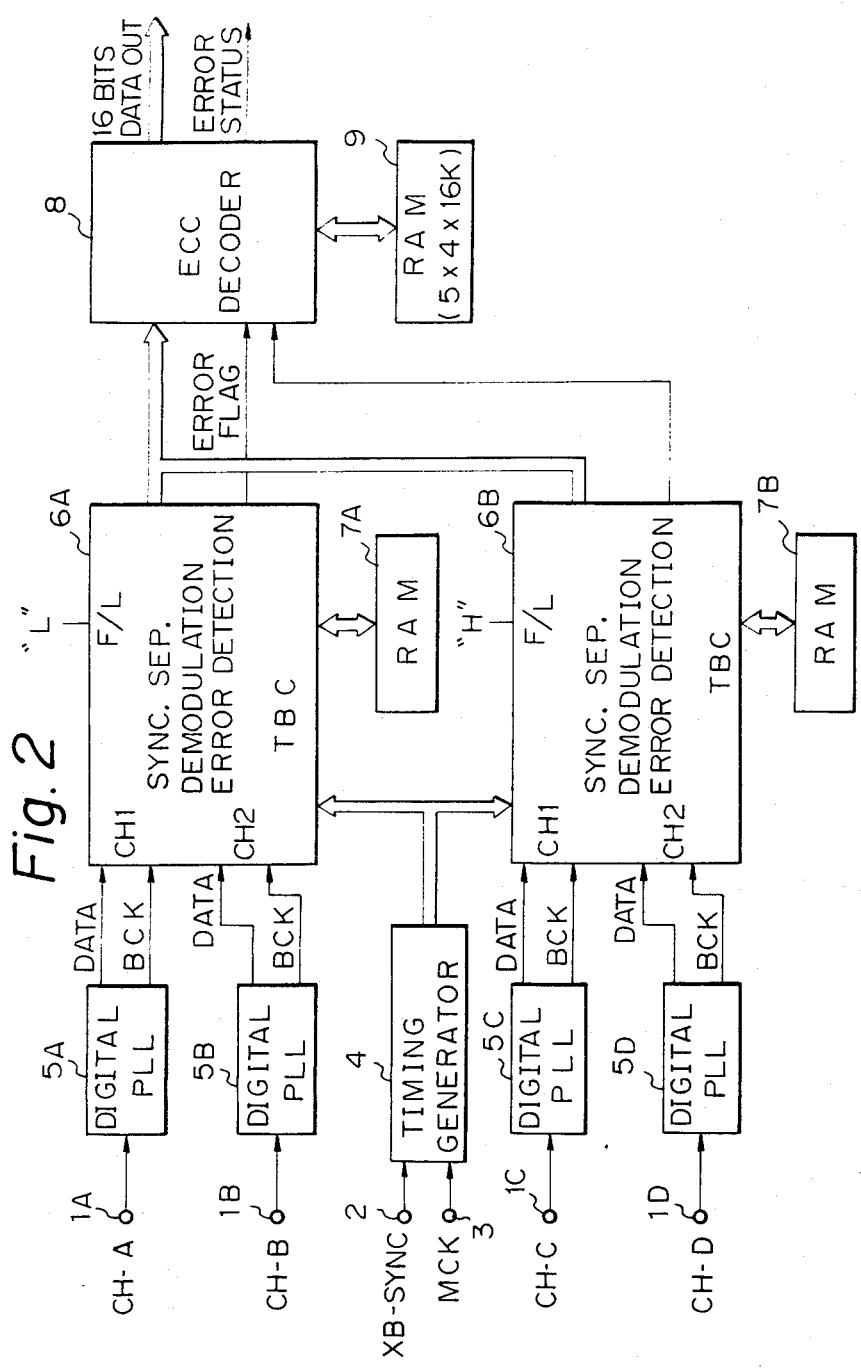
FIG. 2 is a block diagram showing the main section in an embodiment of the digital laudio tape recorder to which the invention is applied.

FIG. 2 shows a schematic diagram of a circuit constitution for extracting the data trains from the signals of four channels reproduced from a magnetic tape, performing the time base correction to the data trains, and thereafter executing the error correction. The reproduction data trains of the channels A to D reproduced from the magnetic tape are respectively supplied to reproduction data input terminals 1A to 1D. A master clock MCK based on the crystal oscillating frequency is supplied to an input terminal 3. A block sync signal XB-SYNC synchronized with the master clock is supplied to an input terminal 2. Various kinds of timing signals are formed by a timing generator 4 on the basis of the master clock and block sync signal. The reproduction data trains supplied to the input terminals 1A to 1D are input to digital PLL units 5A to 5D. A bit clock BCK is extracted from the reproduction data trains.

The reproduction data train of each channel and the bit clock BCK are supplied every two channels to circuit blocks 6A and 6B for performing the detection of synchronization, demodulation, error detection, and time base correction, which will be explained in detail hereinafter. Buffer memories 7A and 7B for the time base correction are connected to the circuit blocks 6A and 6B, respectively. The time base corrected data and error flags are supplied to an error detection circuit 8 to time share process the data of four channels. A buffer memory 9 is also connected to the error correction circuit 8. The data which was error corrected by the error correcting circuit 8 is properly corrected by an error interpolating circuit (not shown) at the post stage by use of the error status information which is simultaneously output. Thereafter, it is D/A converted and output as analog audio signals.

Figure 3A:
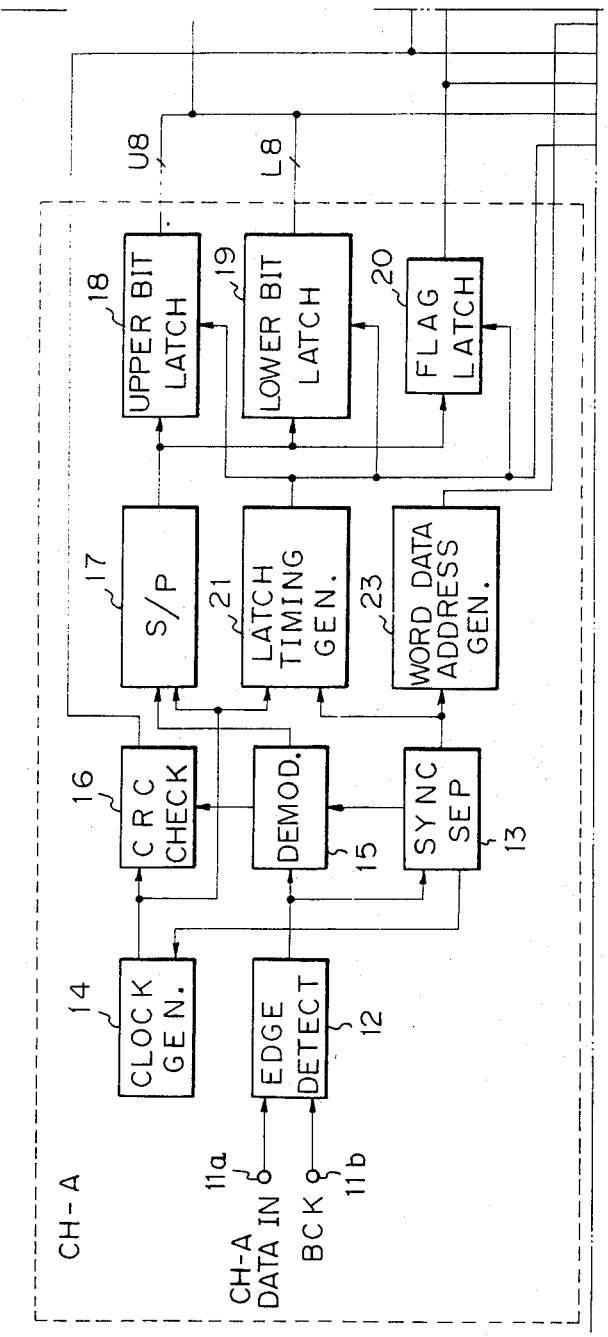
Figure 3B:
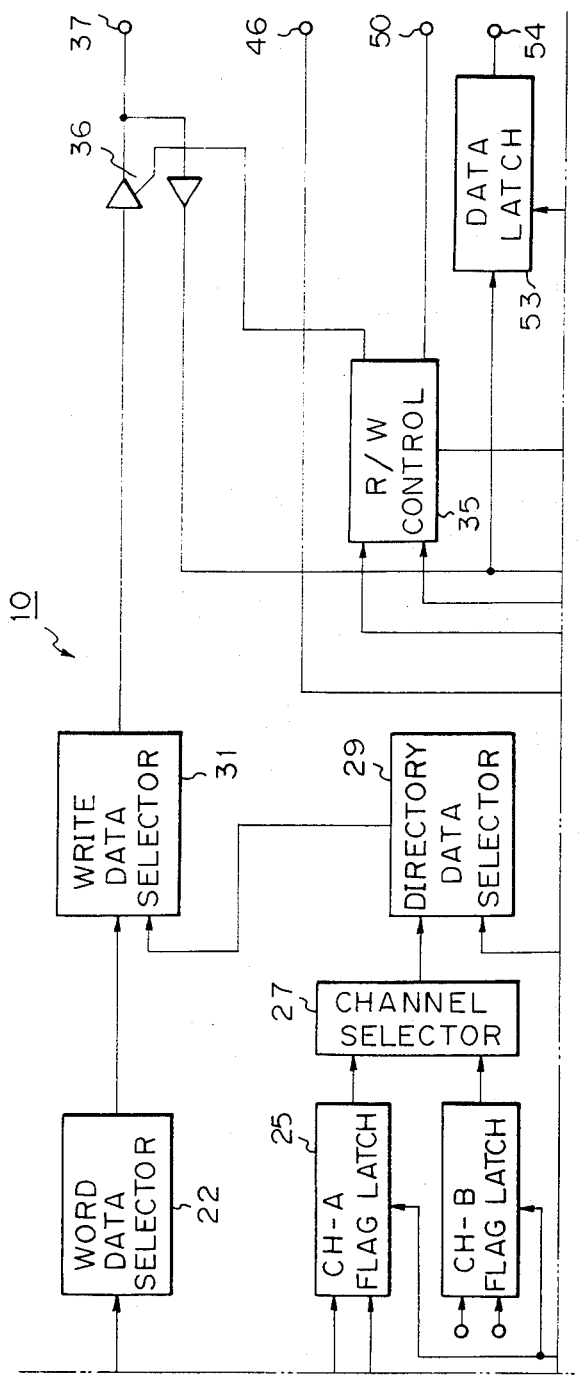
Figure 3C:
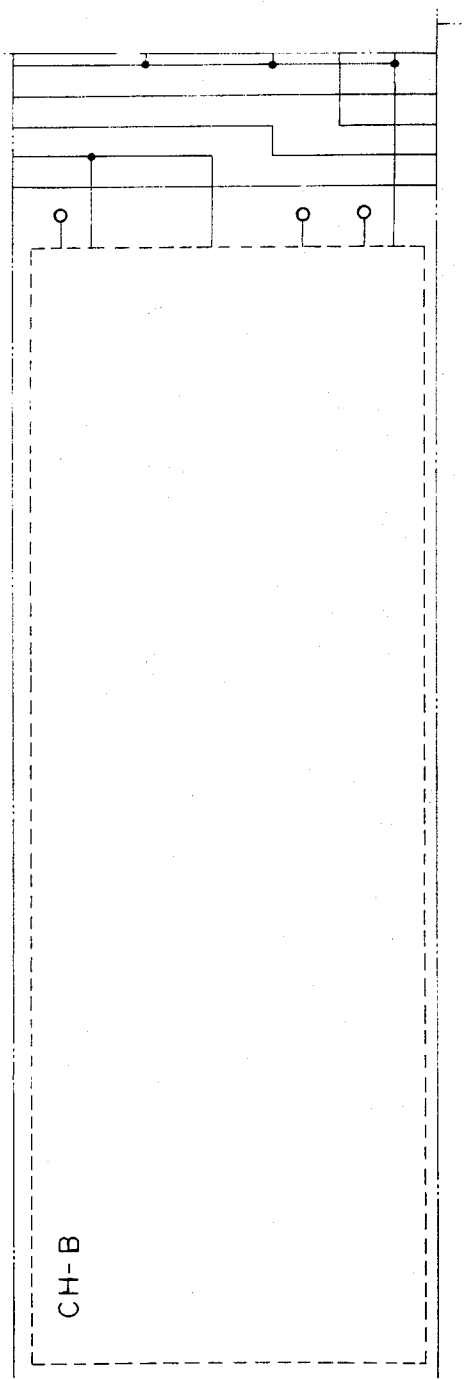
Figure 3D:
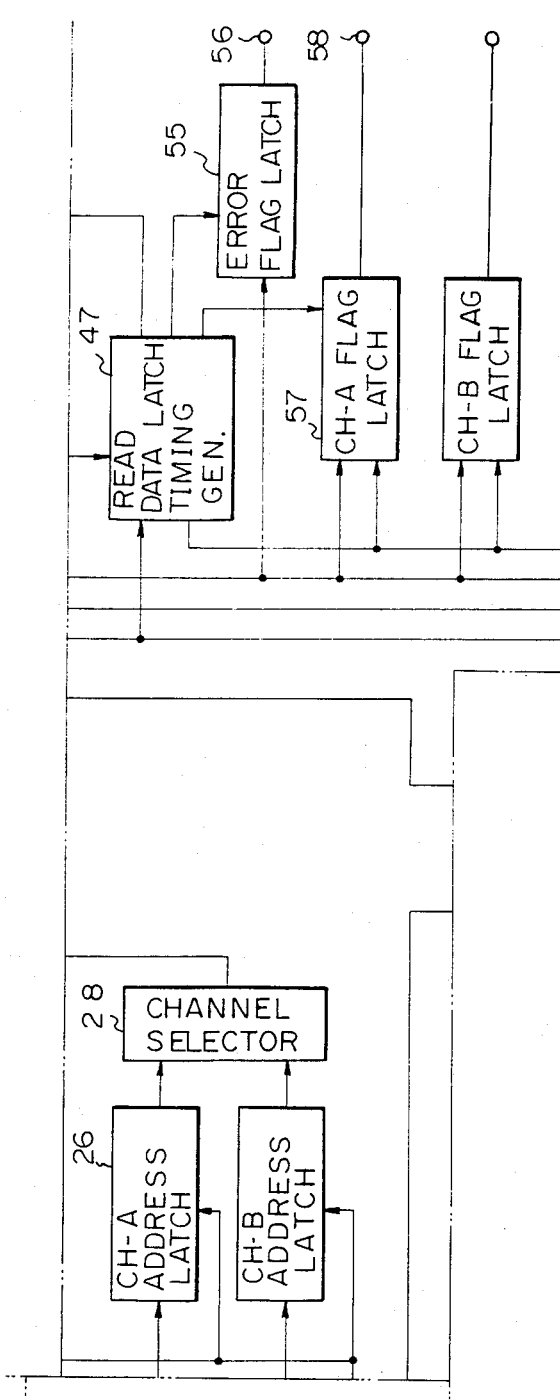

The circuit blocks 6A and 6B, which perform the sync detection, demodulation, error detection, and time base correction will now be described in detail with reference to FIG. 3 (FIGS. 3A to 3B). The circuit to perform the sync detection, demodulation, error detection, and the like is shown in the diagram with respect to only one channel. However, the same circuit is also provided for another channel. The time base correction circuit can time sharingly process the data of two channels.

Referring to channel A (CH-A), the reproduction channel signal is supplied from an input terminal 11a to an edge detecting circuit 12. The bit clock BCK extracted from the reproduction channel signal by the digital PLL 5A shown in FIG. 2 is also supplied from an input terminal 11b to the edge detecting circuit 12. The edge detecting circuit 12 detects the code inversion included in the reproduction channel signal synchronously with the bit block BCK and outputs a detection pulse at this detection timing. An output from the edge detecting circuit 12 is supplied to a sync separating circuit 13. The block sync pattern shown in FIG. 1 is detected and a block sycn signal XB-SYNC is output. The block sync signal XB-SYNC is supplied to a clock generator 14 and a clock signal synchronized with the block sync signal XB-SYNC is formed.

On the other hand, the detection pulse from the edge detecting circuit 12 is supplied to a demodulator 15 of the channel coding and the data train is demodulated from the reproduction channel signal. The channel coding and its demodulator are disclosed in detail in U.S. Pat. Nos. 4,369,472 or 4,428,007 and their descriptions are omitted here.

The demodulated data train is supplied to an error detecting circuit 16. The presence or absence of errors is checked every block by use of the CRCC and an error flag indicative of the presence or absence of errors is output. In this case, the error detection of the block address and data is particularly important.

On the other hand, the data train from the demodulator 15 is supplied to a serial/parallel converter (S/P converter) 17, constituted by a shift register of eight bits and converted into parallel data of eight bits. The data from the S/P converter 17 is supplied to an upper bit latch 18, a lower bit latch 19, and a flag latch 20. Latch timing pulses are supplied to the latches 18, 19 and 20 from a latch timing generator 21. The S/P converter 17 and latch timing generator 21 operate in response to clocks from the clock generator 14.

The upper bit latch 18 latches the symbols of the upper eight bits of the word data of one sample of sixteen bits, such as audio PCM signals, check code of the error correction code, or the like. The lower bit latch 19 latches the symbols of lower eight bits of the word data. The flag latch 20 latches the block address, reserved bits, and flag bit in the reproduction data.

Outputs of the upper and lower bit latches 18 and 19 are supplied to a write data selector 22 of the word data. Word data to be written into a memory for word data is output from the write data selector 22.

By counting the clocks from the sync separating circuit 13, a lower address in the column direction of a memory for word data, i.e., for the symbols of an eight-bit unit is formed by an address generator 23 of the word data memory. An upper address in the row direction of the memory for word data, i.e., for the block is formed by an address generator 24 of the word data memory, which will be explained hereinafter.

On the other hand, the block address, reserved bits, and flag bit from the flag latch 20 and the error flag from the error detecting circuit 16 are latched by a flag latch 25. The upper address from the address generator 24 is supplied to an address latch 26.

Figure 4:
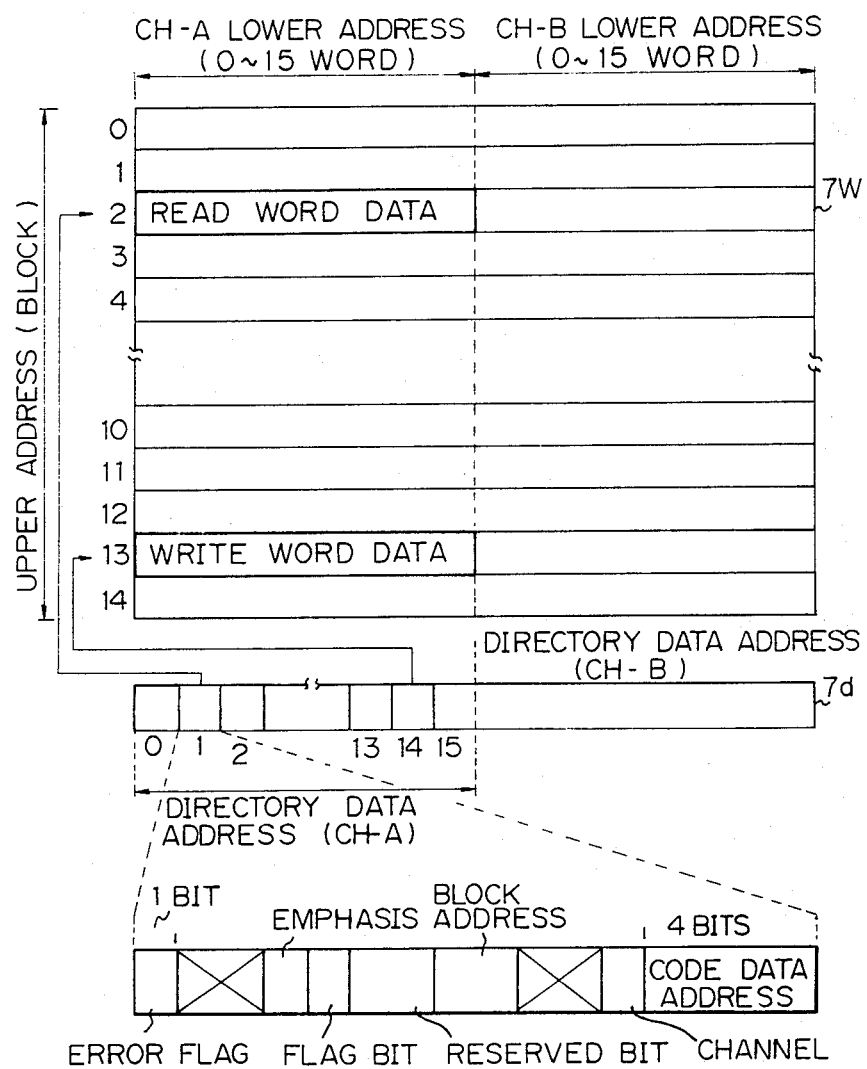
FIG. 4 is a schematic diagram for explaining the operation of the time base correction circuits shown in FIGS. 2 and 3.

The data in the flag latch 25 and address latch 26 of each channel are supplied to a directory data selector 29 through a channel selectors 27 and 28, respectively. The directory data which is written into a memory for directory data is output from the selector 29. In this embodiment, the memory area in one RAM 7A or 7B (FIG. 2) is separately used as a memory area 7w for word data and as a memory area 7d for directory data as shown in FIG. 4. Therefore, the word data from the write data selector 22 and the directory data from the directory data selector 29 are supplied to a write data selector 31. Either one of the word data and the directory data which are written into the RAM 7A or 7B is selectively output from the write data selector 31. A write timing signal is formed by a write timing generator 33 on the basis of a timing clock which is generated from the timing generator 4 and supplied to an input terminal 32. This write timing signal and a latch timing signal which is generated from the latch timing generator 21 are supplied to a data write controller 34 consisting of a flip-flop and a data write control signal is formed. Together with the timing clock from the input terminal 32, the data write control signal is supplied to a memory read/write controller 35. A switching signal is output from the controller 35. A tri-state 36 buffer connected to the write data selector 31 is controlled so that the word data and directory data from an output of a data input/output terminal 37 synchronized with a write timing. With respect to the directory data, the write timing signal which is formed by the write timing generator 33 and the error flag from the error detecting circuit 16 are supplied to a directory data write controller 38 consisting of a flip-flop. Only when the error flag indicates the absence of errors, a control signal is output and supplied to the memory read/write controller 35. Only if it is decided to have no error as the result of the error detection by the error detecting circuit 16, the directory data is output to the data I/O terminal 37. Such a control method is also disclosed in U.S. Pat. No. 4,398,224.

The memory area 7w for word data is designated by, for example, the upper address of four bits of 0 to 14 indicative of the block, the lower address of five bits of 0 to 31 representative of 32 symbols each consisting of eight bits corresponding to 16 words per block, and the middle address of one bit indicative of the channel. The memory area 7d for the directory data is designated by, for example, the upper address of four bits which are all "1", the lower address of four bits of 0 to 14 indicative of the block, and the middle address of one bit representative of the channel. A method of producing these addresses will now be explained.

A sector sync signal XS-SYNC having the crystal oscillating frequency and the block sync signal XB-SYNC are input to an input terminal 39. A read address in the memory area for directory data synchronized with these sector sync signals and a block sync signal is produced by a directory read address generator 40 and supplied to an address selector 41. In a directory write address generator 42, a write address in the memory area 7d for the directory data is formed by the read address from the read address generator 40, a lock mode signal from an input terminal 43, a whole delay amount of the time base correction circuit from an input terminal 44, and a block address in the reproduciton data from the flag latch 20. A predetermined offset is given to the read address. The write address is supplied to the address selector 41 through a channel selector 45. The locking mode is disclosed in U.S. Pat. No. 4,492,989 and its description is omitted here.

On the other hand, the write address in the memory area for word data is formed by the word write address generators 23 and 24 as mentioned above. A control signal is output from the directory data write controller 38 only when the error flag from the error detecting circuit 16 indicates the absence of error. The upper address of the write address is formed when the control signal from the controller 38 is supplied as a clock to the address generator 24 together with the control signal from the data write controller 34. Therefore, only when it is determined to have no error as the result of the error detection, the write address in the memory area for word data is increased.

As described above, the write address for the word data memory consisting of the upper address from the address generator 24 and the lower address from the address generator 23, the directory read address from the address generator 40, and the directory write address from the address generator 42 are output as address signals of the RAM 7A or 7B to an address output terminal 46 through the address selector 41. The word data is written into the memory area 7w in the RAM 7A or 7B and the directory data is written into or read out from the memory area 7d in the RAM 7A or 7B in accordance with these address signals. Immediately after the data is read out of the memory area 7d for directory data, the error flag bit is written into the state indicative of the presence of errors with respect to the area in the address which was read out. Such a control method is disclosed in U.S. Pat. No. 4,398,224. Therefore, it is not shown in the diagrams and its description is also omitted here.

The directory data which was read out of the memory area 7d in the RAM 7A or 7B is input from the data I/O terminal 37. The upper address of the write address in the word data memory area in the RAM 7A or 7B is taken into a word read address latch 48 by a latch signal which is formed by a read data latch timing generator 47, on the basis of the control signal which is output from the memory write/read controller 35. This upper address is supplied to the address selector 41 through a channel 49. The lower address is formed in response to timing clocks including various kinds of frequency dividing clocks from the input terminal 32. These upper and lower addresses are used as a word read address. On the basis of this read address, the word data is read out of the memory 7w in the RAM 7A or 7B. The data readout/write control from/to the RAM 7A or 7B is performed by a write enable signal which is output from the memory read/write controller 35 to an output terminal 50. The readout control of the word data from the RAM 7A or 7B is performed in the following manner. A control signal from a First/Latter output controller 52 is supplied to the memory read/write controller 35 and data latch timing generator 47 by a First/Latter (F/L) mode signal which is supplied to an input terminal 51. When the word data is time sharingly output, a selection is made with regard to whether the word data is output in the former half or in the latter half. This is because although the circuit block 6A or 6B processes the data of two channels, the error correction circuit 8 can process the data of four channels.

The word data which was read out of the word data memory area 7w in the RAM 7A or 7B is supplied from an output terminal 54 to the error correction circuit 8 at the post stage through a data latch circuit 53 which is controlled by the latch signal from the read data latch timing generator 47. On the other hand, the error flag in the directory data which was read out of the memory area 7d for directory data is supplied from an output terminal 56 to the error correction circuit 8 at the post stage through an error flag latch 55 which is controlled by the latch signal from the read data latch timing generator 47. Further, the flag bit including the emphasis information in the directory data is also output from an output terminal 58 through a flag latch 57, which is controlled by the latch signal from the generator 47.

The operation in the foregoing constitution will now be simply described with reference to FIG. 4. If it is determined that there is no error detector by the error detecting circuit 16, the word data of 16 bits of the relevant block is written into the memory area 7w for word data in the RAM 7A or 7B which is designated by the word write addresses generated from the address generators 23 and 24. FIG. 4 shows a state in which the word data is at present being written into the area in the upper address "13". At the same time, with regard to this block, the directory data is written into the memory area 7d for directory data which is designated by the directory write address generated from the address generator 41. This directory data includes: the error flag of one bit indicative of the absence of errors which is output from the error detecting circuit 16; the emphasis information of one bit included in the block sync work; another flag bit of one bit; the reserved bits of two bits; the block address of two bits; the data of one bit indicative of the channel information; and the upper address of four bits which is formed by the address generator 24. FIG. 4 shows a state in which the directory data corresponding to the word data written into the area in the upper address "13" has been written in the directory area in the address "14". When the directory data is written in this manner, the upper address of the word write address is increased by the control signal which is supplied from the directory data write controller 38 to the address generator 24. If errors are found, as the result of the error detection, the word data of this block is one written into the memory area 7w which is designated by the word write address which was increased. However, since no control signal is supplied from the directory data write controller 38 to the address generator 24, the upper address is not increased. Therefore, the word data of the bock which was determined to have no error is further overlapping written into the same address, so that the word data which has already been written into the block that was determined to have errors is erased. On the other hand, since the corresponding directory data is not written into the memory area 7d for directory data, the error flag indicative of the presence of errors, which was written just after it had been read out before, remains.

The directory data is read out of the memory area 7d on the basis of the read address from the read address generator 40 which was locked to the oscillating accuracy of the crystal oscillator. If the error flag indicates the absence of errors, the word data address is latched into the read address latch 48 and at the same time, the error flag of the area which was read out is forcedly written into the state indicative of the presence of errors as mentioned above. The latched read address is supplied as the read address to the memory area 7w and the word data is read out. FIG. 4 shows a state in which the directory data is read out of the area in the directory address "1" in the memory area 7d for the directory data and the word data is read out of the area in the upper address "2" in the memory area 7w for word data by use of the word address written in the readout directory data.

If the error flag of the directory data indicates the presence of errors, no word data is read out the memory area 7w. Even in the buffer memory 9 connected to the error correction circuit 8 at the post stage, in a manner similar to the buffer memory 7A or 7B for time base correction, after the data was read out, it is soon rewritten into the data with errors and at the same time, the error flag is also rewritten to the state indicative of the presence of errors. Therefore, if no word data is output from the time base correction circuit 6A or 6B, the erroneous data which has already been written remains in the corresponding area in the buffer memory 9 of the error correction circuit 8.

According to the invention, the address in the block determined to have no error is written into the memory area directory data and the word data is read out of the memory area for word data in accordance with this address, so that the reproduction data train of one block is stored. The temporary memory and its control circuit are unnecessary. Thus, the time base correction circuit with a simple constitution using one RAM can be realized.

In addition to the foregoing embodiment, it is also possible to write the word data or directory data into the memory area for word data or into the memory area for directory data irrespective of the presence or absence of errors. On the other hand, not only the word data but also a sync word, a redundancy code of an error detection code, or the like can be written into the memory area for word data.

The present invention is not limited to the time base correction circuit but can be widely applied to a memory circuit of an error correction circuit and other memory circuits.

The present invention is not limited to the foregoing embodiments but many modifications and variations are possible within the spirit and scope of the appended claims of the invention.

What is claimed is:

1. An apparatus for storing digital data comprising:
   data input means for receiving data blocks each including at least block address data for identifying the block, main data, and redundancy data forming an error detection or correction code, together with data including block address data for detecting the presence or absence of any error in the block address data;
   error detecting means for detecting the presence or absence of any error in the block address data determined by use of the redundancy data and for producing an error detection signal when any error is detected in the block address data;
   first write address generating means for generating first write address data;
   first memory means for storing at least the main data among the data block according to the first write address data from said first write address generating means;
   second write address generating means for generating second write address data;
   second memory means for storing the first write address data from said first write address generating means according to the second write address data from said second write address generating means when the address data is determined to have no error by said error detecting means;
   second read address generating means for generating second read address data, whereby the first write address data stored in said second memory means is read out according to the second read address data; and
   first read address generating means for generating first read address data according to the first write address data read out from said second memory means, whereby the main data stored in said first memory means is read out according to the first read address data.

* * * * *